US010427179B2

(12) United States Patent
Posselius et al.

(10) Patent No.: US 10,427,179 B2
(45) Date of Patent: Oct. 1, 2019

(54) LOW FLOW METERING SYSTEM (71) Applicant: CNH Industrial America LLC, New Holland, PA (US)

(72) Inventors: John Posselius, Ephrata, PA (US); Tim Stombaugh, Nicholasville, KY (US); Yongbo Wan, Dublin, OH (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/267,471

(22) Filed: Sep. 16, 2016

(65) Prior Publication Data
US 2017/0080444 A1  Mar. 23, 2017

Related U.S. Application Data

(60) Provisional application No. 62/219,928, filed on Sep. 17, 2015.

(51) Int. Cl.
*B05B 7/32* (2006.01)
*B05B 12/14* (2006.01)
*G05D 11/13* (2006.01)
*A01C 23/04* (2006.01)
*A01C 23/00* (2006.01)
*B05B 1/30* (2006.01)

(52) U.S. Cl.
CPC ............ *B05B 7/32* (2013.01); *B05B 12/1418* (2013.01); *G05D 11/135* (2013.01); *A01C 23/007* (2013.01); *A01C 23/047* (2013.01); *B05B 1/3053* (2013.01)

(58) Field of Classification Search
CPC ......... B05B 9/0403; B05B 1/30; B05B 12/02; B05B 7/32; B05B 12/1418; B05B 1/3053; A01C 23/007; A01C 23/047; F16K 31/06; G05D 11/135

USPC .......................................................... 239/71
See application file for complete search history.

(56) References Cited

U.S. PATENT DOCUMENTS

| 4,318,443 A | * | 3/1982 | Cummins ............ B01F 5/0408 |
| | | | 169/15 |
| 4,873,925 A | | 10/1989 | Hultberg et al. |
| 5,134,961 A | | 8/1992 | Giles et al. |
| 5,249,929 A | | 10/1993 | Miller, Jr. et al. |
| 5,294,089 A | | 3/1994 | LaMarca |
| 6,062,496 A | | 5/2000 | Kinter |
| 6,089,532 A | | 7/2000 | Rohloff et al. |
| 6,250,564 B1 | | 6/2001 | Chahley |
| 6,314,979 B1 | | 11/2001 | Lips |
| 6,522,948 B1 | | 2/2003 | Benneweis |

(Continued)

OTHER PUBLICATIONS

"Development of Single Nozzle, High Pressure Liquid Pesticide Metering and Injection System," Brian David Luck, University of Kentucky, 2009.

(Continued)

*Primary Examiner* — Chee-Chong Lee
(74) *Attorney, Agent, or Firm* — Rebecca L. Henkel; Rickard K. DeMille (57) ABSTRACT

A system for metering liquids at very low flows for use with agricultural sprayers is provided. The system may utilize two electronically controlled solenoid valves in series with a storage chamber in between. The flow may be a function of the PWM control of each of the valves, the phase relationship between the control signals, the storage chamber in between, the pressure difference across the metering device, and the fluid being metered.

6 Claims, 10 Drawing Sheets

(56) References Cited

U.S. PATENT DOCUMENTS

| | | | |
|---|---|---|---|
| 6,619,612 B2 | 9/2003 | Freisinger et al. | |
| 6,742,718 B2 | 6/2004 | Doebler et al. | |
| 6,883,726 B2 | 4/2005 | Polk et al. | |
| 8,109,448 B2* | 2/2012 | Giles | A01M 7/006 239/428 |
| 8,141,504 B2* | 3/2012 | Dean | A01C 7/081 111/179 |
| 8,186,288 B2* | 5/2012 | Chinkiwsky | A01B 79/005 111/200 |
| 8,191,795 B2* | 6/2012 | Grimm | A01M 7/0089 239/1 |
| 8,191,798 B2* | 6/2012 | Hahn | A01C 23/007 239/11 |
| 8,286,939 B2 | 10/2012 | Li et al. | |
| 8,488,874 B2* | 7/2013 | Zaman | A01M 7/0089 382/162 |
| 8,635,963 B2* | 1/2014 | Friggstad | A01C 7/084 111/175 |
| 8,800,593 B2 | 8/2014 | Sakasegawa et al. | |
| 9,504,212 B2* | 11/2016 | Michael | A01G 25/16 |
| 2002/0027213 A1 | 3/2002 | Jensen | |
| 2006/0273189 A1 | 12/2006 | Grimm et al. | |
| 2013/0037625 A1 | 2/2013 | Arenson et al. | |
| 2015/0059626 A1 | 3/2015 | Conrad et al. | |

OTHER PUBLICATIONS

"Development of a Variable-Orifice Spay Nozzle with High Pressure Chemical Injection for Improved Pesticide Efficacy," Joe David Luck, University of Kentucky, 2012.

Urbain, Clair; No-Till Farmer; The New Era of Spray Application; Retrieved from web-site on May 8, 2015: http://www.no-tilifarmer.com/articles/57-the-new-era-of-spray-application05/01/2014.

Eng. & Tech. Sustainable World; An intelligent sprayer Engineering & Technology for a Sustainable World 21.4 (Jul. 2014): Retrieved from ProQuest Dialog on May 8, 2015: http://search.proquest.com/professional/docview/1545548152?accountid=157282.

Liu et al.; Developement of Digital Flow Control System for Multi-Channel Variable Rate Sprayers;Transactions of the ASABE 57.1 (Feb. 2014): 273-281; Retrieved from ProQuest Dialog on May 8, 2015: http://search.proquest.com/professional/docview/1559684316?accountid=157282.

Han, Shufeng: Modification and testing of a commercial sprayer with PWM solenoids for precision spraying Appl Eng Agric 17.5 (Sep. 2001): 591-594; Retrieved from ProQuest Dialog on May 8, 2015: http://search.proquest.com/professional/docview/1330629853?accountid=157282.

Chen Aiwu et al.; ICCASM 2010 Design of flow control system on sprayer 2010 International Conference on Computer: Application and System Modeling (ICCASM 2010) Oct. 22, 2010; Retrieved from ProQuest Dialog on May 8, 2015: http://search.proquest.com/professional/docview/853570337?accountid=157282.

Andy Collings: Extending sprayer capabilities Farmers Weekly Collings, Jun. 3, 2011: Retrieved from ProQuest Dialog on May 8, 2015: http://search.proquest.com/professional/docview/874070943?accountid=157282.

* cited by examiner

LOW FLOW METERING SYSTEM

CROSS-REFERENCE TO RELATED APPLICATIONS

This is a non-provisional application based upon U.S. provisional patent application Ser. No. 62/219,928, entitled "Low Flow Metering System," filed Sep. 17, 2015 which is incorporated herein by reference.

FIELD OF THE INVENTION

The present invention relates generally to agricultural implements, and in particular, to spray systems providing metering of fluid at very low flow rates for use with agricultural field sprayers.

BACKGROUND OF THE INVENTION

Field sprayers, as known in the art, are typically attached to, or towed, by an agricultural implement such as a tractor or other vehicle or are a dedicated self-propelled sprayer vehicle. Such sprayers generally include a fluid holding tank supported by a frame. The fluid holding tank typically stores a crop protection fluid, such as pesticides or liquid fertilizer, which often consists of a carrier fluid (such as water) mixed with a chemical at a predetermined concentration. The fluid holding tank, in turn, is fluidly coupled to a series of spray nozzles spaced apart from one another along booms extending outwardly from the frame. Accordingly, the crop protection fluid may be dispensed through the spray nozzles onto the farm field, preferably in an even distribution spray pattern, so that the fluid is applied consistently across the farm field.

In some situations, it may be necessary to meter a flow of liquid material at a very low flow rate, such as on the order of 100 milliliters per minute (mL/min) or less. This situation could arise, for example, while attempting to achieve a low concentration of chemical fluid with respect to a carrier fluid (such as water) to be sprayed. Traditional control techniques, such as reduced nozzle orifice sizes or Pulse Width Modulation (PWM) controlled valves allowing flow only at limited times, have various drawbacks. For example, when operating in agricultural environment in which the soil may be disturbed by movement of the sprayer, particles in the environment or impurities and/or lumps in the chemical fluid may cause very small orifices to clog. Also, most electronically controlled solenoid valves do not respond reliably when the duty cycle of PWM control signals are very low.

What is needed is an improved system for in which a fluid may be reliably metered at very low flow rates.

SUMMARY OF THE INVENTION

A system for metering liquids at very low flows for use with agricultural sprayers is provided. The system may utilize two electronically controlled solenoid valves in series with a storage chamber in between. The flow may be a function of the PWM control of each of the valves, the phase relationship between the control signals, the storage chamber in between, the pressure difference across the metering device, and the fluid being metered.

On a sprayer, an independent distribution system for a chemical may be installed to deliver concentrated chemical along a boom to individual spray nozzles at a pressure higher than the carrier pressure. A metering device may control the flow of concentrated chemical from that distribution system as it is injected into the carrier flow stream at the nozzle.

In one aspect, a system could include two series connected solenoid operated valves with a charge chamber in between. The charge chamber can vary in size and can be made from materials of different elasticity, or exhibiting specific expandability, such as a spring loaded diaphragm. Both valves may be PWM controlled independently, but generally at the same frequency. For low flow control, there is preferably no overlap in PWM pulses for the respective valves. The inlet valve may open to charge the chamber then close to trap pressurized fluid. The outlet valve may that open to release the charge. Smaller chambers having limited elasticity may reduce the volume of discharged fluid. Valves may also be kept relatively large to reduce clogging. For higher flow requirements, valve controls may be overlapped to cause a controlled time of continuous flow through both valves. For even higher flows, one valve can be held open while the other valve limits flow based on traditional PWM control.

Accordingly, the system may provide control of relatively low flow rates without requiring more expensive valves having fast response times. The system may also eliminate the need for very small orifices and passages that could cause clogging issues. PWM frequency may also be kept high enough to limit pulsing of the controlled flow with reliable operation.

Specifically then, one aspect of the present invention provides a spray system for use with an agricultural sprayer comprising: a first distribution path for distributing a first fluid (which may be a carrier fluid such as water); a second distribution path for distributing a second fluid (which may be a full concentrate pesticide or some chemical fluid); a spray nozzle assembly providing first and second inlets for receiving the first and second fluids, respectively, a mixing chamber for mixing the first and second fluids to provide a mixed fluid, and an outlet for spraying the mixed fluid, wherein the spray nozzle assembly may be in communication with the first distribution path for receiving the first fluid at the first inlet; a fluid storage chamber; a first electronically controlled valve coupled between the second distribution path and the fluid storage chamber for controlling flow of the second fluid from the second distribution path to the fluid storage chamber; and a second electronically controlled valve coupled between the fluid storage chamber and the second inlet of the spray nozzle assembly for controlling flow of the second fluid from the fluid storage chamber to the second inlet of the spray nozzle assembly.

The fluid storage chamber may be operable to expand with pressure from the second fluid. Also, the spray system may further comprise a controller in communication with the first and second electronically controlled valves, wherein the controller may be configured to control at least one of the first and second electronically controlled valves with a Pulse Width Modulation (PWM) signal.

For a higher flow, the controller may hold one of the first and second electronically controlled valves open while the other of the first and second electronically controlled valves may be controlled with the PWM signal.

For a medium or low flow, the controller may be configured to control the first electronically controlled valves with a first PWM signal and control the second electronically controlled valves with a second PWM. The first and second PWM signals may have substantially the same frequency and differ in phase.

For the medium flow, the first PWM signal controls the first electronically controlled valve to open during a first time while the second PWM signal controls the second electronically controlled valve to open, then the first PWM signal controls the first electronically controlled valve to close during a second time while the second PWM signal controls the second electronically controlled valve to remain open, and then the first PWM signal controls the first electronically controlled valve to remain closed during a third time while the second PWM signal controls the second electronically controlled valve to close.

For the low flow, the first and second PWM signals may further differ in duty cycle. The first PWM signal may control the first electronically controlled valve to open during a first time while the second PWM signal controls the second electronically controlled valve to close, then the first PWM signal may control the first electronically controlled valve to close during a second time while the second PWM signal controls the second electronically controlled valve to remain closed, and then the first PWM signal may control the first electronically controlled valve to remain closed during a third time while the second PWM signal controls the second electronically controlled valve to open The second distribution path will typically distribute the second fluid at a higher pressure than the first distribution path distributing the first fluid.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
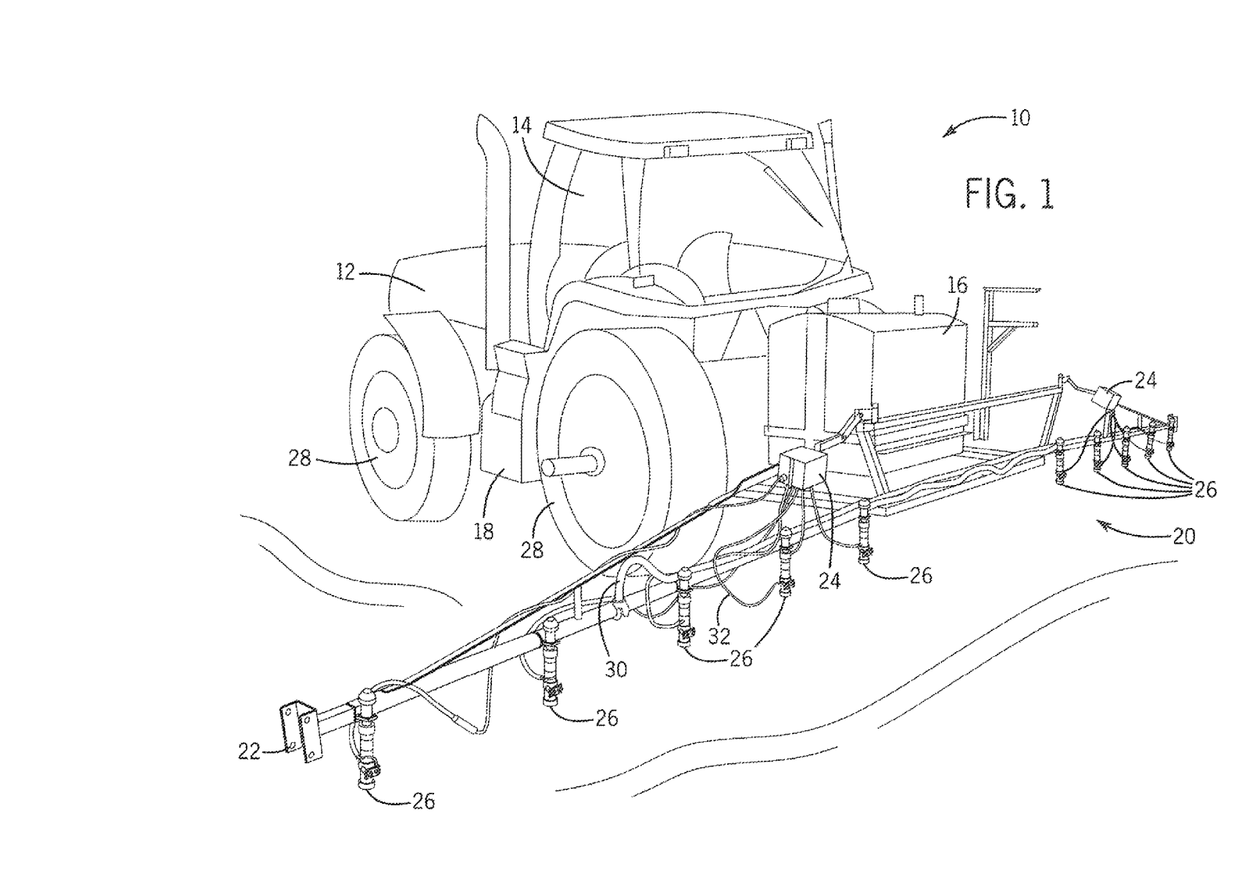
FIG. 1 illustrates a pictorial view of a spraying system in accordance with the present invention.

Referring generally to the drawings, and more particularly to FIG. 1, an exemplar agricultural product application system, which in the illustrated embodiment is a field spraying system 10 (a tractor with a three point mounted sprayer attached), is shown in accordance with the present invention. The field spraying system 10 may comprise a self-propelled sprayer 12 having an operator cab 14 and a primary fluid tank 16 supported by a chassis 18. A rear end 20 of the chassis 18 may support a wing boom 22 (or multiple wing booms) to which one or more secondary fluid tanks, which could be provided as illustrated by reference numeral 24, may be supported. The wing boom 22 also supports a series of spray nozzle assemblies 26 for spraying an area of a field. The chassis 18 is supported by a set of wheels 28, and the wing boom 22, depending on size, may be supported by a set of smaller wheels (not shown).

Primary distribution lines 30 are flow coupled between the primary fluid tank 16 and the spray nozzle assemblies 26. The primary fluid tank 16 may typically store a earner fluid such as water. The primary distribution lines 30 may provide flow of the carrier fluid to the spray nozzle assemblies 26 directly or indirectly, such as via one or more charge pumps, accumulators, control valves, pressure relief valves, manifolds and/or supplemental distribution, lines in the path as understood in the art for effecting various flow rates, pressures and control for sprayer configurations.

Secondary distribution lines, which could be provided as illustrated by reference numeral 32, may be flow coupled between one or more of the secondary fluid tanks 24 and the spray nozzle assemblies 26. The secondary fluid tanks 24 may typically store a chemical fluid, such as a liquid fertilizer, pesticide, herbicide, or the like. The secondary distribution lines 32 may provide flow of the chemical fluid to the spray nozzle assemblies 26 directly or indirectly, such as via one or more charge pumps, accumulators, control valves, pressure relief valves, headers, manifolds and/or supplemental distribution lines in the path as understood in the art for effecting various flow rates, pressures and control for sprayer configurations. Accordingly, the carrier fluid and the chemical fluid may be stored in different tanks and subsequently mixed at each of the spray nozzle assemblies 26 thereby providing improved distribution in the field. The secondary fluid tanks 24 are typically smaller than the primary fluid tank 16.

Figure 2:
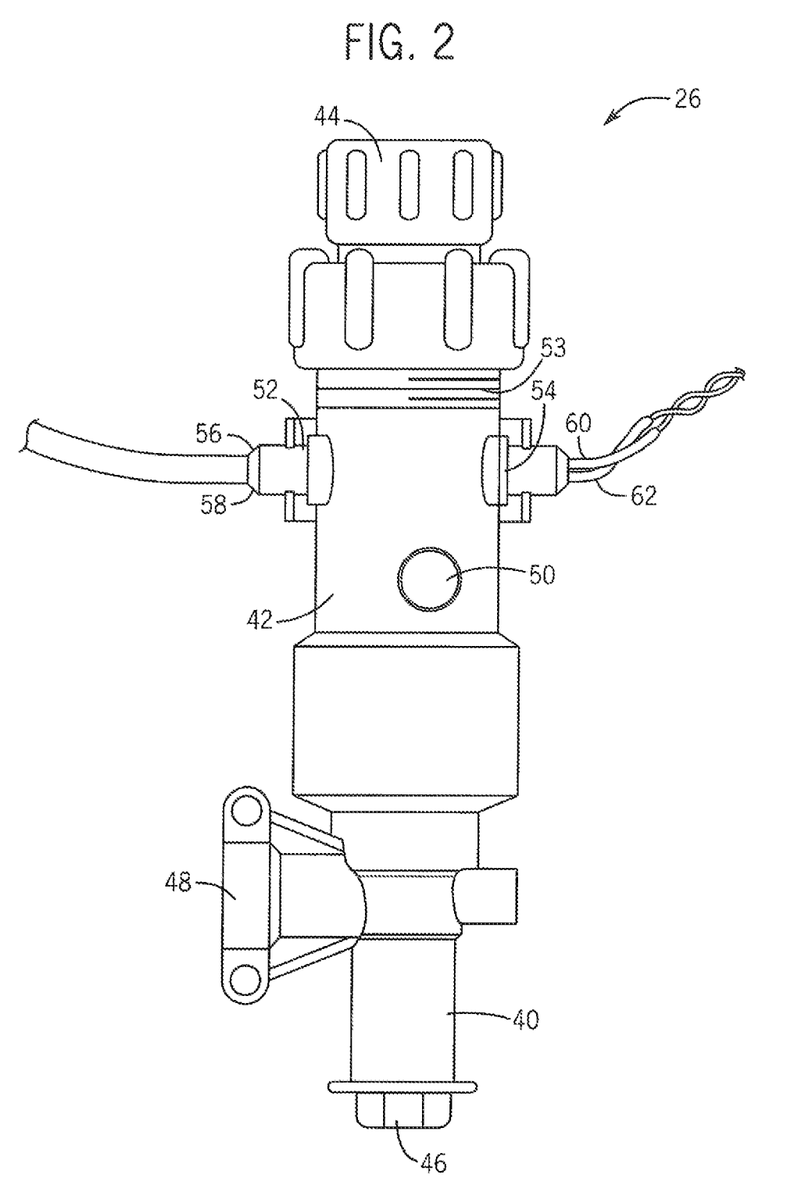
FIG. 2 illustrates a pictorial view of a spray nozzle assembly in accordance with the present invention.

Referring now to FIG. 2, in a spray system, a pictorial view of an exemplar spray nozzle assembly 26 is provided in accordance with the present invention. The spray nozzle assembly 26 may generally include a nozzle body 40, coupled in turn to a mixing body 42, coupled in turn to a control valve 44. In one aspect, the nozzle body 40 may be thread coupled to the mixing body 42, and the mixing body 42 may be thread coupled to the control valve 44, although other temporary or permanent coupling techniques known in the art could be used, such as pressure fittings and/or adhesive agents.

The nozzle body 40 includes a nozzle outlet 46 (exposing an orifice) for spraying a mixed fluid which will typically consist of a carrier fluid (such as water) mixed with a chemical fluid at some concentration. The nozzle body 40 may also include a nozzle body inlet 48 for receiving the carrier fluid. The carrier fluid may come from the primary fluid tank 16 via the primary distribution lines 30.

The mixing body 42 may include a mixing body inlet 50 for receiving the chemical fluid (such as a liquid fertilizer, pesticide, herbicide, or the like). The chemical fluid may come from either of the secondary fluid tanks 24 via the secondary distribution lines 32. Within the mixing body 42, a flow control mechanism (shown in FIG. 3) may provide a mixing chamber for mixing the carrier fluid with the chemical fluid in the nozzle to provide the mixed fluid.

Figure 3:
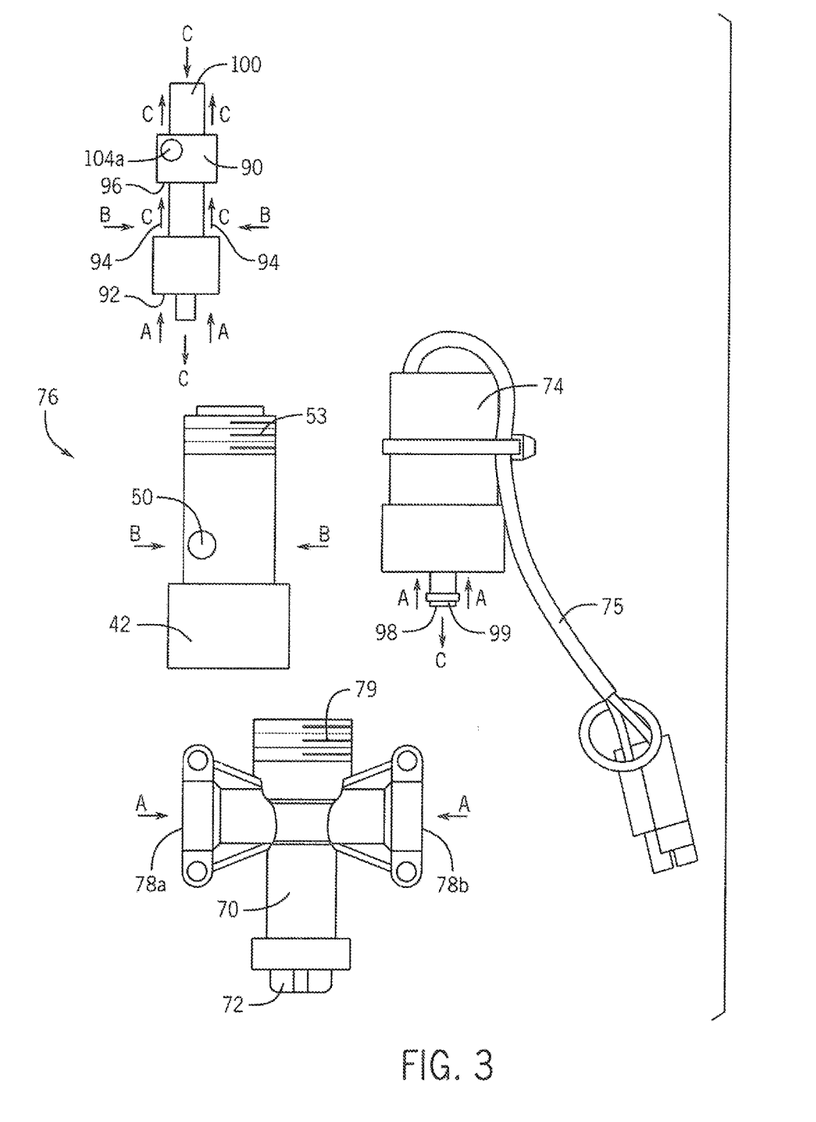
FIG. 3 illustrates an exploded pictorial view of an alternative spray nozzle assembly having the mixing body of FIG. 2, but with an alternative nozzle body and an alternative control valve, in accordance with the present invention.

The control valve 44 operates to stop the mixed fluid from flowing to the nozzle outlet 46, or to allow the mixed fluid to flow to the nozzle outlet 46 for spraying. The control valve 44 could be a passive check valve, as shown in FIG. 2, in which the mixed fluid is mechanically stopped from flowing if there is insufficient pressure applied by the mixed fluid against a valve mechanism, or the mixed fluid is allowed to flow if there is a build-up of sufficient pressure of the mixed fluid against the valve mechanism. Alternatively, the control valve 44 could be an actively controlled solenoid valve, as shown in FIG. 3 by reference numeral 74, in which the mixed fluid is stopped from flowing or allowed to flow depending on a control signal provided to a solenoid which actuates a valve. Accordingly, the control valve 44 may serve to prevent undesirable leaking of the mixed fluid. Also, the control valve 44 may be operator or computer controlled in the field.

Still referring to FIG. 2, a light source 52 and a light sensitive receiver 54 may each be connected to the spray nozzle assembly 26. The light source 52 and the light sensitive receiver 54 may be contained in separate housings, and each of the housings may fit in opposing openings of the mixing body 42 with fluid tight seals. The light source 52 may be any circuit, element or device for emitting light in the mixing body, and may preferably be a Light. Emitting Diode (LED). First and second light source signals 56 and 58, respectively, may interface with other control systems or circuitry of the field spraying system 10 and may allow for turning on or off the light source 52, biasing, and/or controlling the intensity, brightness and/or wavelength of light produced by the light source 52.

The light sensitive receiver 54 may be any circuit, element or device for receiving light in the mixing body and generating an electrical signal indicating an amount of light received by the light sensitive receiver 54. The light sensitive receiver 54 may preferably be a photodiode. In particular, the light sensitive receiver 54 may receive light from the light source 52 (passing through the mixed fluid) within the mixing body 42. First and second light sensitive receiver signals 60 and 62, respectively, may interface with other control systems or circuitry of the field spraying system 10 and may allow for sending an electrical signal indicating the amount of light received by the light sensitive receiver 54, biasing, and/or controlling the wavelength of light to which the light sensitive receiver 54 may be sensitive.

In sending the electrical signal indicating the amount of light received, one of the first and second light sensitive receiver signals 60 and 62, respectively, could be used to provide an analog voltage having a magnitude in proportion to the amount of light received by the light sensitive receiver 54, while the other of the first and second light sensitive receiver signals 60 and 62, respectively, could provide a reference level. In an alternative aspect, digital circuitry could be employed in the light sensitive receiver 54 so that the first and/or second light sensitive receiver signals 60 and/or 62, respectively, provide a digital representation of the magnitude of light received.

Referring now to FIG. 3, an exploded pictorial view of an alternative spray nozzle assembly 76 having the mixing body 42 of FIG. 2, but with an alternative nozzle body 70 and an alternative control valve 74, is provided in accordance with the present invention. In this aspect, the nozzle body 70 may include first and second nozzle body inlets 78*a* and 78*b*, respectively, for receiving the carrier fluid instead of a single nozzle inlet. Accordingly, the multiple inlets (the first and second nozzle body inlets 78*a* and 78*b*, respectively) may allow for alternative implementations of the spray nozzle assembly 76 in the field spraying system 10, such as ganging a plurality of spray nozzle assemblies 76 together. The nozzle body 70 may be coupled to the mixing body 42, for example, via nozzle body threading 79.

Also in this aspect, the control valve 74 is an actively controlled solenoid valve. Accordingly, mixed fluid is stopped from flowing or allowed to flow depending on a control signal provided, via wiring/interconnect 75, to a solenoid which controls the valve. The wiring/interconnect 75 may interface with other control systems or circuitry of the field spraying system 10 for control of spraying applications in the field. The control valve 74 may be coupled to the mixing body 42, for example, via mixing body threading 53. It will be appreciated that with this configuration, if desired, the mixing body 42 could be removed, and the control valve 74 coupled directly to the nozzle body 70, via nozzle body threading 79, to revert to a de-featured implementation.

Also in this aspect, the mixing body 42 of FIG. 2 is used. The mixing body 42 may include a mixing body inlet 50 (or alternatively first and second mixing body inlets) for receiving the chemical fluid.

Figure 4A:
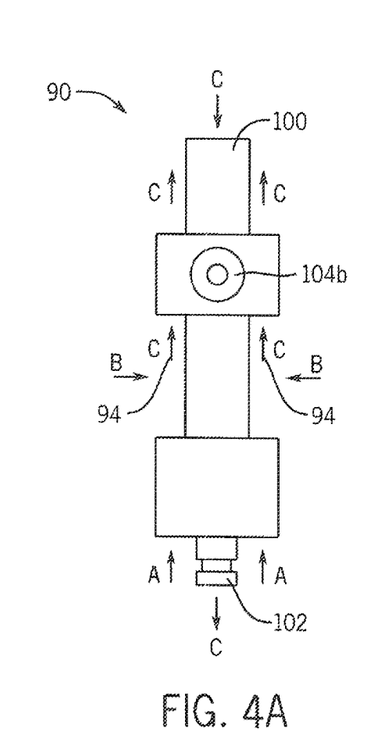
FIG. 4A illustrates a pictorial view of a mixing body.
Figure 4B:
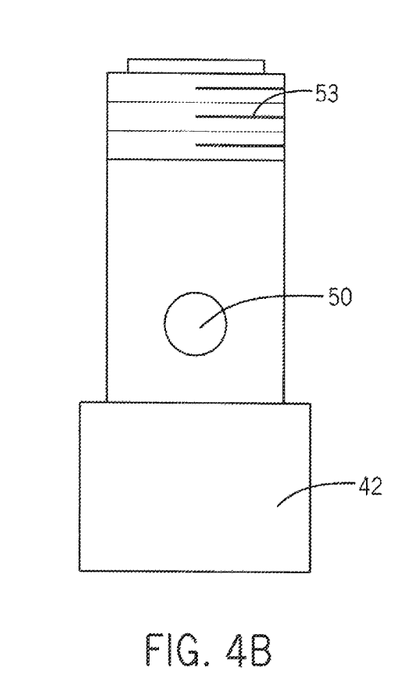
FIG. 4B illustrates a pictorial view of a flow control body, each in accordance with the present invention.

Within the mixing body 42, a flow control mechanism 90 may be provided for directing fluid flow within the spray nozzle assembly 76. With additional reference to 4A, fluid flow is depicted by way of arrows reference characters. In particular, arrows with the reference character "A" denote flow of the carrier fluid; arrows with the reference character "B" denote flow of the chemical fluid; and arrows with the reference character "C" denote flow of the mixed fluid.

In operation, the carrier fluid A is received via the first and second nozzle body inlets 78*a* and 78*b*, respectively, of the nozzle body 70. The carrier fluid A is directed through a first interior opening 92 (which may be a plurality of openings) in the flow control mechanism 90, leading to a mixing chamber 94. The mixing chamber 94 may be defined by a cavity formed by exterior walls of the flow control mechanism 90 and interior walls of the mixing body 42.

The chemical fluid B is received via the mixing body inlet 50 of the mixing body 42. The chemical fluid B is directed to the mixing chamber 94, thereby mixing in the nozzle to form the mixed fluid C. The mixed fluid C, in turn, is directed through a second interior opening 96 (which may be a plurality of openings) in the flow control mechanism 90, leading to the control valve 74.

Upon sufficient pressure of the mixed fluid C, such as with a check valve, or upon actuation of the control valve 74, such as with the solenoid valve, the mixed fluid C will then flow through the control valve 74 and exit via a control valve outlet 98. The control valve outlet 98 is fluidly coupled with an interior channel 100 of the flow control mechanism 90 and may be fluid sealed with a sealing member 99. The mixed fluid C may then, in turn, travel through the interior channel 100 to an orifice 102 proximal to the nozzle outlet 72 of the nozzle body 70 for spraying.

Still referring to FIGS. 3 and 4A, the mixing body includes first and second openings 104a and 104b, respectively, for accommodating the light source 52 and the light sensitive receiver 54 with fluid tight seals. In one aspect, the first openings 104a could receive the light source 52, and the second opening 104b could receive the light sensitive receiver 54, and the first and second openings 104a and 104b could be opposing such that a fluid inspection region for transmitting light through the mixed fluid is formed in between. Transmission of light from the light source 52 to the light sensitive receiver 54, through the fluid inspection region, may allow determining a concentration of the chemical fluid in the mixed fluid by determining how much light is received by the light sensitive receiver 54 (and how much light is inhibited by the mixed fluid).

Figure 5:
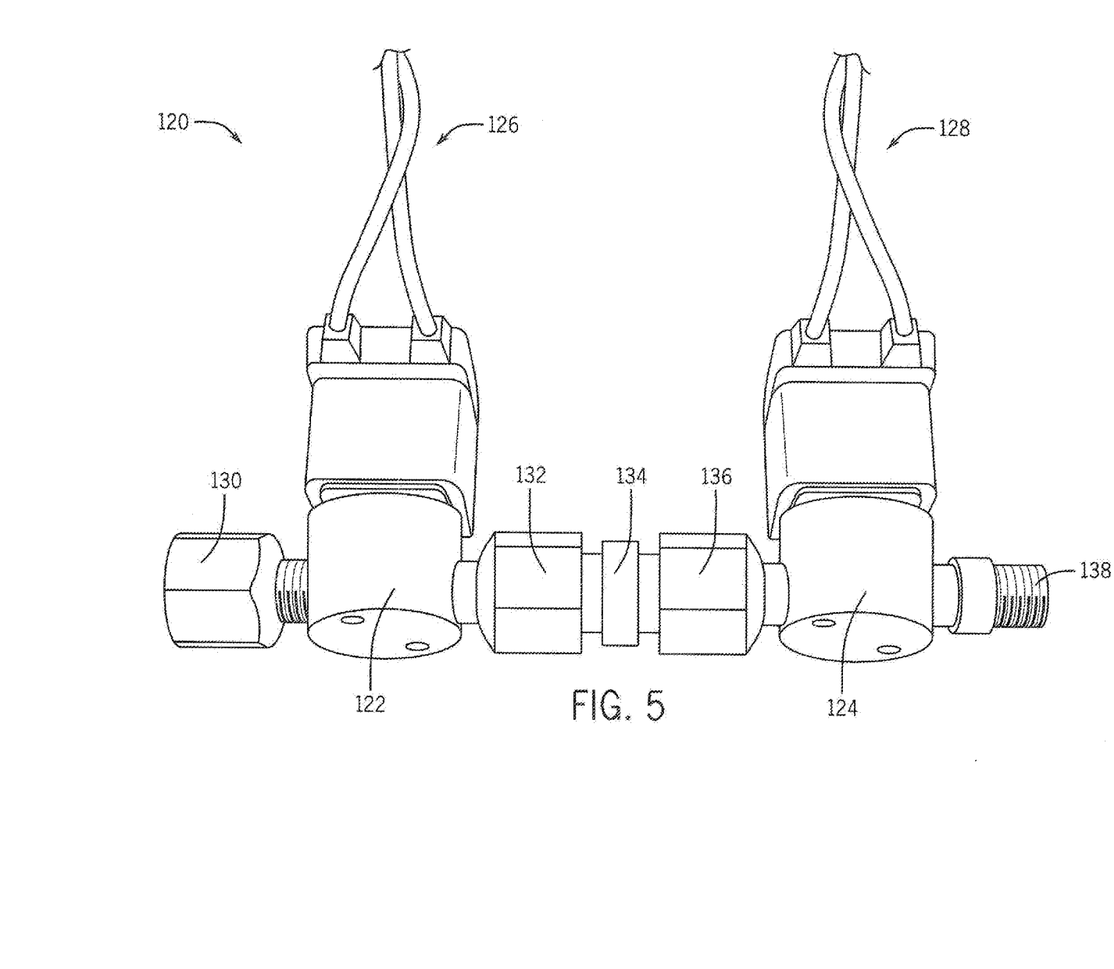
FIG. 5 illustrates a pictorial view of a metering system having two electronically controlled valves in series with a storage chamber in between for metering a fluid, at a low flow rate in accordance with the present invention.

Referring now to FIG. 5, a pictorial view of a metering system 120 having two electronically controlled valves in series with a storage chamber in between for metering a fluid at a low flow rate is provided in accordance with the present invention. First and second electronically controlled valves 122 and 124, respectively, are provided, which may each be actively controlled solenoid valves operating in a manner similar to the solenoid control valve 74 described above with respect to FIG. 3. Accordingly, the first and second electronically controlled valves 122 and 124, respectively, may each be controlled to stop fluid or allow fluid to flow depending on a control signal provided via first and second wirings 126 and 128, respectively. The first and second wirings 126 and 128, respectively, may interface with other control systems or circuitry of the field spraying system 10. Accordingly, the first and second electronically controlled valves 122 and 124, respectively, may receive first and second Pulse Width Modulation (PWM) signals, respectively, for there modulated control from the control systems or circuitry of the field spraying system 10.

The first electronically controlled valve 122 may have a first electronically controlled valve inlet 130 for receiving fluid from a fluid supply. In a preferred aspect, the first electronically controlled valve inlet 130 may be coupled to a distribution path drawing the chemical fluid from the secondary fluid tank 24 via the secondary distribution line 32.

The first electronically controlled valve 122 may also have a first electronically controlled valve outlet 132 for providing the received fluid to a fluid storage chamber 134 when open. The fluid storage chamber 134 may be operable to expand with pressure from the fluid, and the fluid in the fluid storage chamber 134 may also undergo an amount of compression. The fluid storage chamber 134, in turn, may be coupled to a second electronically controlled valve inlet 136 of the second electronically controlled valve 124. The second electronically controlled valve inlet 136 may also have a second electronically controlled valve outlet 138 for providing, the fluid further downstream, such as to the mixing body inlet 50 of the spray nozzle assembly 76.

Figure 6A:
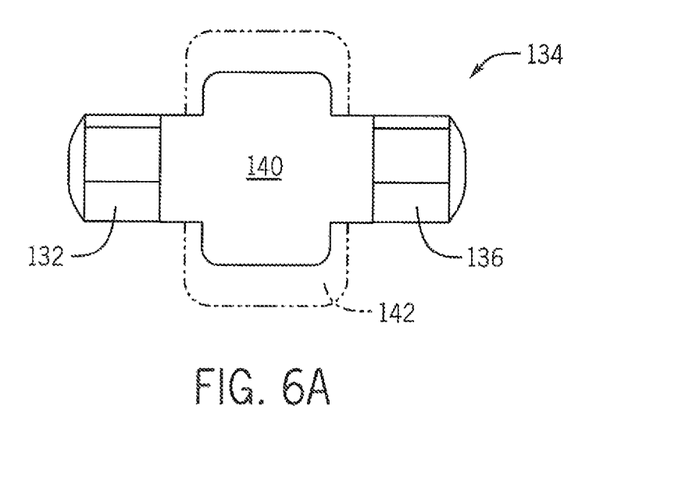
FIG. 6A illustrates a pictorial view of a fluid storage chamber operable to expand based on elasticity.

Referring briefly to FIG. 6A, the fluid storage chamber 134 may operably expand from a first volume 140 to a second volume 142, the material of which, accordingly exhibiting elasticity. In this arrangement, the fluid storage chamber 134 may operably expand from the first volume 140 to the second volume 142, for example, when the second electronically controlled valve 124 is closed and the first electronically controlled valve 122 is open, thereby causing a pressure of the fluid in the fluid storage chamber 134 to build against interior walls of the fluid storage chamber 134 to increase the fluid storage chamber 134 volume. In addition, the fluid held in the second volume 142 may also undergo an amount of compression due to the first electronically controlled valve 122 continuing to push fluid into the fluid storage chamber 134.

Figure 6B:
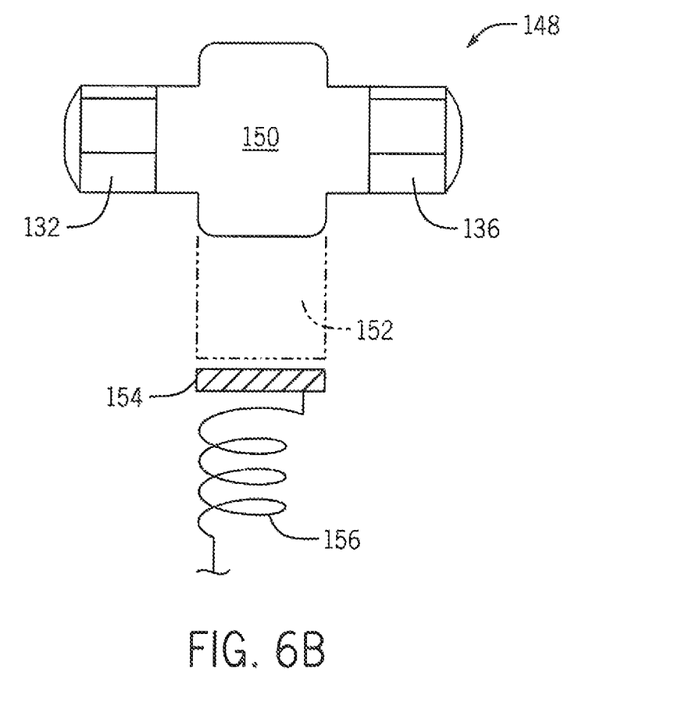
FIG. 6B illustrates a pictorial view of an alternative fluid storage chamber operable to expand based on a spring loaded diaphragm, each in accordance with the present invention.

Referring briefly to FIG. 6B, in an alternative arrangement, a fluid storage chamber 148 may instead consist of first volume 150 which may operably expand to a second volume 152 via a diaphragm 154 and a spring 156. In this spring loaded diaphragm arrangement, the fluid storage chamber 148 may operably expand from the first volume 150 to the second volume 152, for example, when the second electronically controlled valve 124 is closed and the first electronically controlled valve 122 is open, thereby causing a pressure of the fluid in the fluid storage chamber 148 to build against the diaphragm 154 to thereby compress the spring 156 to increase the fluid storage chamber 148 volume. In addition, the fluid held in the second volume 152 may also undergo an amount of compression due to the first electronically controlled valve 122 continuing to push fluid into the fluid storage chamber 148.

Figure 7:
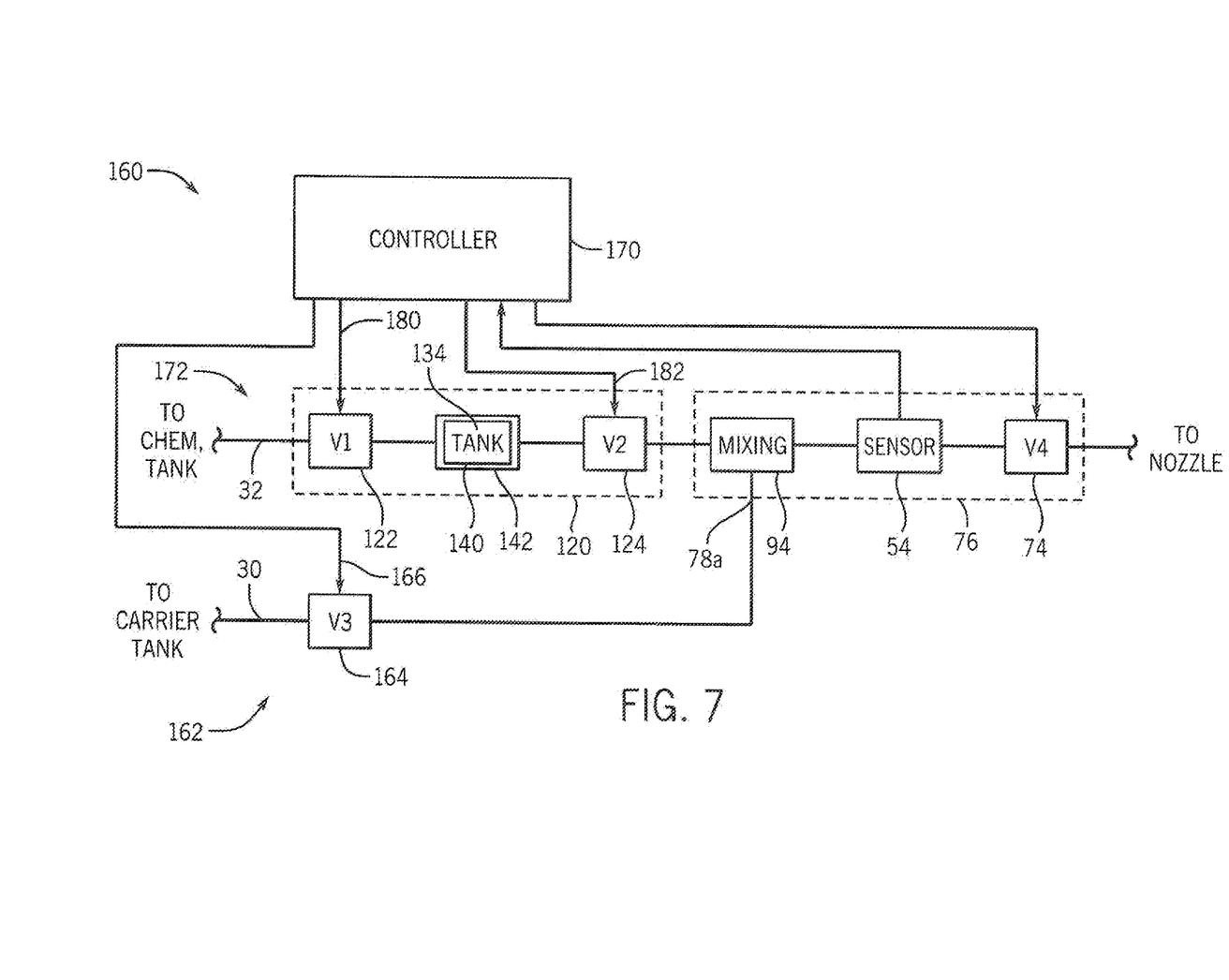
FIG. 7 illustrates a schematic view of a control system having the metering system of FIG. 5 and the spray nozzle assembly FIG. 3 in accordance with the present invention.

Referring now to FIG. 7, a schematic view of a control system 160 having the metering system 120 of FIG. 5 and the spray nozzle assembly 76 of FIG. 3 is provided by way of example in accordance with the present invention. A first distribution path 162 is provided for distributing a first fluid, which may be the carrier fluid stored in the primary fluid tank 16. The first distribution path 162 may receive the carrier fluid via the primary distribution line 30, and may include a third electronically controlled valve 164 (identified as "V3"), which may be a solenoid valve operating in a manner similar to the solenoid control valves described above with respect to FIGS. 3 and 5, for metering the carrier fluid to the spray nozzle assembly 76 (and to the mixing chamber 94).

A controller 170 may be configured, among other things, to control the third electronically controlled valve 164, such as via a carrier fluid metering PWM signal 166. The controller 170 may be a microprocessor, a microcontroller or other programmable logic element as known the art.

A second distribution path 172 is provided for distributing a second fluid, which may be the chemical fluid stored in the secondary fluid tank 24. The second distribution path 172 may receive the chemical fluid via the secondary distribution line 32. The second distribution path 172 preferably distributes the chemical fluid at a higher pressure than the first distribution path 162 distributing the carrier fluid.

The second distribution path 172 may lead to the metering system 120, which may include the first electronically controlled valve 122 (identified as "V1"), coupled in turn to the fluid storage chamber 134, coupled in turn to the second electronically controlled valve 124 (identified as "V2"). The controller 170 may be configured to control the first and second electronically controlled valves 122 and 124, respectively, via first and second PWM signals 180 and 182, respectively.

The metering system 120, in turn, meters the chemical fluid to the spray nozzle assembly 76 (and to the mixing chamber 94). Within the spray nozzle assembly 76, from the mixing chamber 94, the mixed chemical and carrier fluids (i.e., mixed fluid) may then pass through a fluid inspection region in which the light source 52 transmits light through the mixed fluid to the light sensitive receiver 54 to produce feedback to the controller 170 for indicating the concentration of the chemical fluid in the mixed fluid. Depending on the feedback, the controller 170 may adjust the metering system 120, such as via the first electronically controlled valve 122, the second electronically controlled valve 124, or both, to achieve a target concentration. Moreover, the controller 170 may continuously receive feedback and adjust the metering system 120 as part of a closed loop control system, including for example, by implementing a Proportional-Integral-Derivative (ND) controller or the like.

Although only one metering system 120 and spray nozzle assembly 76 are shown in FIG. 7 by way of example, it will be appreciated that the control system 160 may include numerous metering systems 120 and spray nozzle assemblies 76 of the field spraying system 10.

Low Flow

Figure 8A:
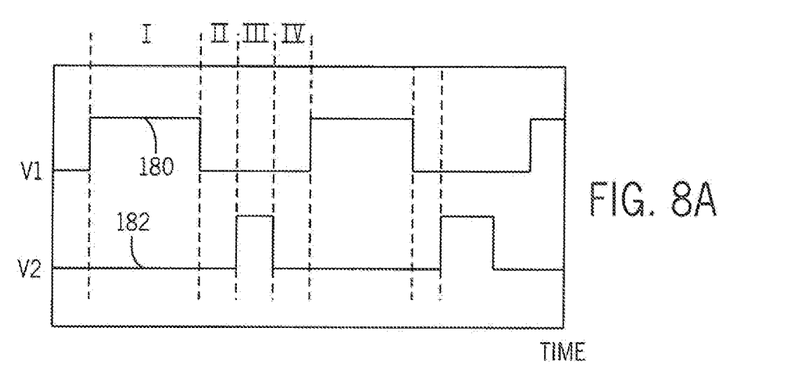
FIG. 8A illustrates a graph for controlling a metering system for achieving a low flow rate.

Referring now to FIG. 8A, a graph for controlling the metering system 120, and the first and second electronically controlled valves 122 and 124, respectively, for achieving a low flow rate is provided in accordance with the present invention. Accordingly, the controller 170 may provide the first and second PWM signals 180 and 182, respectively, at substantially the same frequency. However, the phase and the duty cycles may differ.

During a first time identified as "1," the first PWM signal 1180 may control the first electronically controlled valve 122 (or V1) to open while the second PWM signal 182 controls the second electronically controlled valve 124 (or V2) to close. As a result, fluid enters the fluid storage chamber 134 causing an expansion of the fluid storage chamber 134 and compression of the fluid. Then, during a second time identified as "II," the first PWM signal 180 may control V1 to close while the second PWM signal 182 controls V2 to remain closed. As a result, the fluid held under pressure in the fluid storage chamber 134 is held in delay for a predetermined amount of time. Then, during a third time identified as "III," the first PWM signal 180 may control V1 to remain closed while the second PWM signal 182 controls V2 to open. As a result, the fluid held under pressure is released from the fluid storage chamber 134 toward the spray nozzle assembly 76 (and to the mixing chamber 94). Finally, during a fourth time identified as "IV" the first PWM signal 180 may control VI to remain closed while the second PWM signal 182 controls V2 to also remain closed for another predetermined amount of time. The aforementioned cycle, including I, II, III and IV, may repeat.

Accordingly, in this configuration, the second PWM signal 182 may be entirely out of phase with the first PWM signal 180 such that the second PWM signal 182 is active when the first PWM signal 180 is inactive. Moreover, the duty cycle of the second PWM signal 182 may be less than the duty cycle of the first PWM signal 180 (which may be 50%), such that the fluid held under pressure in the fluid storage chamber 134 may be held in delay for the predetermined amount of time during the second time (II). In some aspects, the active times of the second PWM signal 182 may be advantageously centered during the inactive times of the first PWM signal 180.

Medium Flow

Figure 8B:
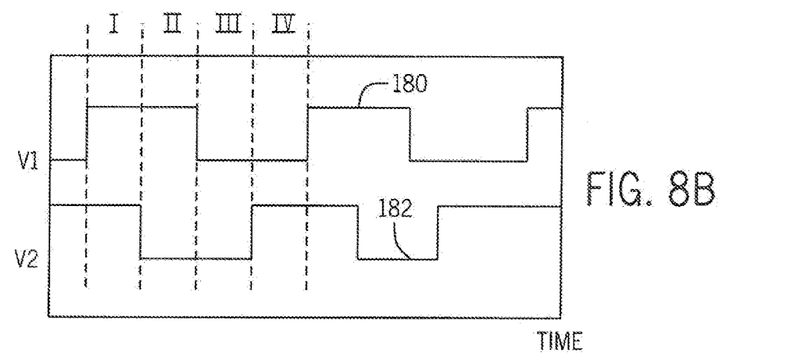
FIG. 8B illustrates a graph for controlling a metering system for achieving a medium flow rate.

Referring now to FIG. 8B, a graph for controlling the metering system 120, and the first and second electronically controlled valves 122 and 124, respectively, for achieving a medium flow rate is provided in accordance with the present invention. Accordingly, the controller 170 may provide the first and second PWM signals 180 and 182, respectively, at substantially the same frequency and duty cycle. However, the phase between the first and second PWM signals 180 and 182, respectively, may differ.

During a first time identified as "I," the first PWM signal 180 may control V1 to open while the second PWM signal 182 controls V2 to open. As a result, fluid enters the fluid storage chamber 134 and continues through V2 toward the spray nozzle assembly 76 without stopping. Then, during a second time identified as "II," the first PWM signal 180 may control V1 to remain open while the second PWM signal 182 controls V2 to close. As a result, fluid enters the fluid storage chamber 134 and stops, causing an expansion of the fluid storage chamber 134 and compression of the fluid. Then, during a third time identified as "III," the first PWM signal 180 may control V1 to close while the second PWM signal 182 controls V2 to remain closed. As a result, the fluid held under pressure in the fluid storage chamber 134 may be held in delay for a predetermined amount of time. Finally, during a fourth time identified as "IV," the first PWM signal 180 may control V1 to remain closed while the second PWM signal 182 controls V2 to open. As a result, the fluid held under pressure is released from the fluid storage chamber 134 toward the spray nozzle assembly 76 (and to the mixing chamber 94). The aforementioned cycle, including I, II, III and IV, may repeat.

Accordingly, in this configuration, the second PWM signal 182 may be partially out of phase with the first PWM signal 180 such that the second PWM signal 182 is active: (1) for a time when the first PWM signal 180 is active; and (2) for a time when the first PWM signal 180 is inactive. The duty cycle of the second PWM signal 182 may be equal to the duty cycle of the first PWM signal 180 (which may be 50%). However, the duty cycle of either PWM signal could be increased with respect to the other to increase flow, or could be decreased with respect to the other to decrease flow.

High Flow

Figure 8C:
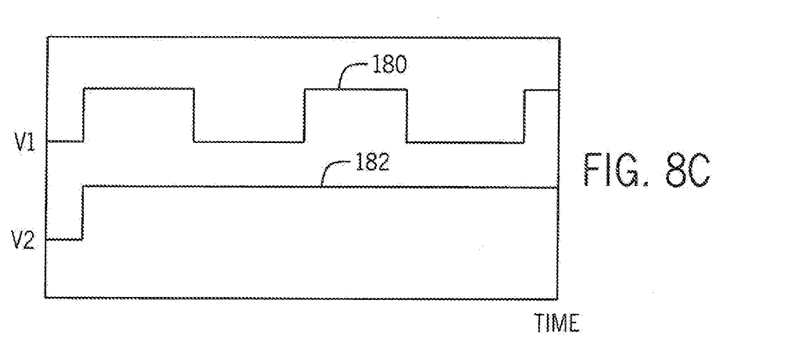
FIG. 8C illustrates a graph for controlling a metering system for achieving a high flow rate, each in accordance with the present invention.

Referring now to FIG. 8C, a graph for controlling the metering system 120, and the first and second electronically controlled valves 122 and 124, respectively, for achieving a high flow rate is provided in accordance with the present invention. In this configuration, the controller 170 may provide the first PWM signal 180 at a frequency and duty cycle, and provide the second PWM signal 182 at a constant level to control V2 to remain open. As a result, fluid enters the fluid storage chamber 134 and continues toward the spray nozzle assembly 76 at a rate of the frequency of the first PWM signal 180 without expansions of the fluid storage chamber 134.

Alternatively, the controller 170 could provide the second PWM signal 182 at a frequency and duty cycle, and provide the first PWM signal 180 at a constant level to control VI to remain open. As a result, fluid enters the fluid storage chamber 134 and continues toward the spray nozzle assembly 76 at a rate of the frequency of the second PWM signal 182 with periodic expansions of the fluid storage chamber 134.

The frequency of the first PWM signal 180 (or the second PWM signal 182) could be increased to increase flow or could be decreased to decrease flow.

Figure 9:
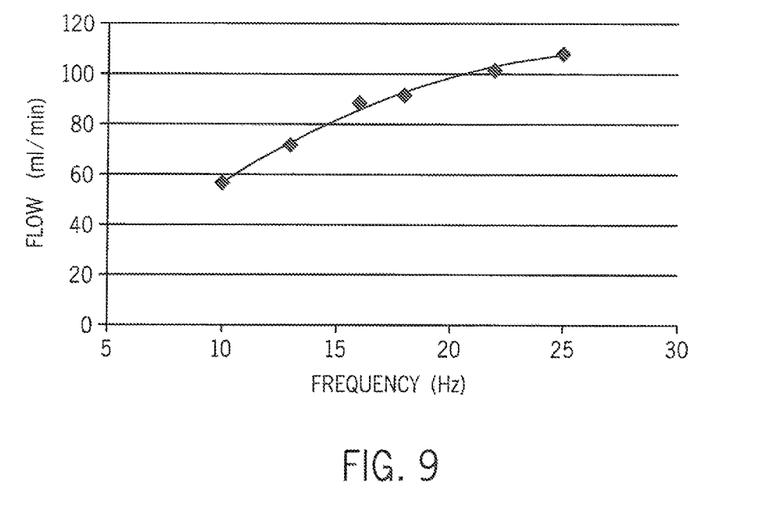
FIG. 9 illustrates a graph comparing exemplar frequencies of the electronically controlled valves with respect to flow rates in accordance with the present invention.

Referring now to FIG. 9, a graph comparing exemplar frequencies of the first and second electronically controlled valves 122 and 124, respectively, on a horizontal axis (Cartesian "x-axis") with respect to flow rates on a vertical axis (Cartesian "y-axis") is provided in accordance with the present invention. The first and second electronically controlled valves 122 and 124, respectively, may be operated at the same frequency via the first and second PWM signals 180 and 182, respectively. As the frequency of operation of the first and second electronically controlled valves 122 and 124 increases, the flow rate of the fluid correspondingly increases. At a lower frequency, such as about 10 Hz, the flow rate may be less than 60 milliliters per minute. However, at a higher frequency, such as about 25 Hz, the flow rate may be greater than 100 milliliters per minute.

Figure 10:
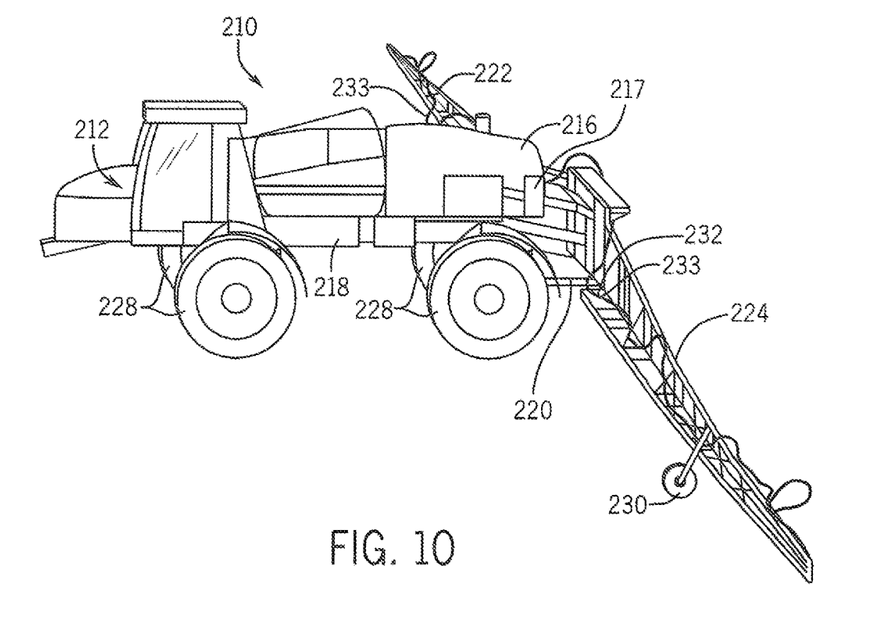
FIG. 10 illustrates a pictorial view of an alternative spraying system in accordance with the present invention.

Referring now to FIG. 10, a pictorial view of an alternative spraying system is provided in accordance with the present invention. A field spraying system 210 may be comprised of a self-propelled sprayer 212 having primary and secondary fluid tanks 216 and 217, respectively, that are supported by a chassis 218 in a known manner. As also known in the art, a rear end 220 of the chassis 218 may supports a pair of wing booms 222, 224 to which a series of the spray nozzle assemblies (not shown) may be coupled. The chassis 218 may be supported by a set of tires 228, and the wing booms may be supported by smaller wheels 230. Primary and secondary distribution lines 232 and 233, respectively, may be flow coupled to the primary and secondary fluid tanks 216 and 217, respectively, in order to provide field spraying capability similar to the field spraying system 10 described above with respect to FIG. 1.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray system for use with an agricultural sprayer comprising:
   a first distribution path for distributing a first fluid;
   a second distribution path for distributing a second fluid;
   a spray nozzle assembly including:
      a nozzle body having a first inlet in communication with the first distribution path for receiving the first fluid at the first inlet, a second inlet for receiving the second fluid and an outlet;
      a mixing body defining a mixing chamber for mixing the first and second fluids to provide a mixed fluid, the mixed fluid being sprayed from the outlet of the nozzle body; and
      a control valve coupled to the mixing body;
   a fluid storage chamber;
   a first electronically controlled valve coupled between the second distribution path and the fluid storage chamber, the first electronically controlled valve moveable between an open and a closed position for controlling flow of the second fluid from the second distribution path to the fluid storage chamber;
   a second electronically controlled valve coupled between the fluid storage chamber and the second inlet of the nozzle body, the second electronically controlled valve moveable between an open and a closed position for controlling flow of the second fluid from the fluid storage chamber to the second inlet of the nozzle body; and
   a controller in communication with the first and second electronically controlled valves, the controller configured to supply a Pulse Width Modulation (PWM) signal to at least one of the first and second electronically controlled valves for controlling the opening and closing thereof;
   wherein:
      the controller is configured to hold one of the first and second electronically controlled valves in the open position while supplying the other of the first and second electronically controlled valves with the PWM signal;
      the control valve operable to control a volume of the mixed fluid sprayed from the outlet of the nozzle body;
      the PWM signal is a first PWM signal;
      the controller is configured to supply the first electronically controlled valve with the first PWM signal and is configured to supply a second Pulse Width Modulation (PWM) signal to the second electronically controlled valve for controlling the opening and closing thereof; and
      the first and second PWM signals have substantially the same frequency and differ in phase, wherein the first and second PWM signals differ in duty cycle.

2. The spray system of claim 1, wherein the fluid storage chamber is operable to expand with pressure from the second fluid.

3. The spray system of claim 1, wherein the second distribution path distributes the second fluid at a higher pressure than the first distribution path distributes the first fluid.

4. The spray system of claim 1, wherein the first and second electronically controlled valves are solenoid valves.

5. A spray system for use with an agricultural sprayer comprising:
   a first distribution path for distributing a first fluid;
   a second distribution path for distributing a second fluid;
   a spray nozzle assembly including:
      a nozzle body having a first inlet in communication with the first distribution path for receiving the first fluid at the first inlet, a second inlet for receiving the second fluid and an outlet; and
      a mixing body defining a mixing chamber for mixing the first and second fluids to provide a mixed fluid, the mixed fluid being sprayed from the outlet of the nozzle body;
   a fluid storage chamber;
   a first electronically controlled valve coupled between the second distribution path and the fluid storage chamber, the first electronically controlled valve moveable between an open and a closed position for controlling flow of the second fluid from the second distribution path to the fluid storage chamber;
   a second electronically controlled valve coupled between the fluid storage chamber and the second inlet of the nozzle body, the second electronically controlled valve moveable between an open and a closed position for controlling flow of the second fluid from the fluid storage chamber to the second inlet of the nozzle body; and
   a controller in communication with the first and second electronically controlled valves, the controller configured to supply a Pulse Width Modulation (PWM) signal to at least one of the first and second electronically controlled valves for controlling the opening and closing thereof;
   wherein:
      the controller is configured to hold one of the first and second electronically controlled valves in the open position while supplying the other of the first and second electronically controlled valves with the PWM signal;

the PWM signal is a first PWM signal;

the controller is configured to supply the first electronically controlled valve with the first PWM signal and is configured to supply a second Pulse Width Modulation (PWM) signal to the second electronically controlled valve for controlling the opening and closing thereof;

the first and second PWM signals have substantially the same frequency and differ in phase;

the first and second PWM signals differ in duty cycle; and the controller is configured to:

supply the first PWM signal to the first electronically controlled valve to open the first electronically controlled valve during a first time and supply the second PWM signal to the second electronically controlled valve to close the second electronically controlled valve during the first time;

supply the first PWM signal to the first electronically controlled valve to close the first electronically controlled valve during a second time and supply the second PWM signal to the second electronically controlled valve to instruct the second electronically controlled valve to remain closed during the second time; and supply the first PWM signal to the first electronically controlled valve to instruct the first electronically controlled valve to remain closed during a third time and supply the second PWM signal to the second electronically controlled valve to open the second electronically controlled valve during the third time.

6. A spray system for use with an agricultural sprayer comprising:

a first distribution path for distributing a first fluid;

a second distribution path for distributing a second fluid;

a spray nozzle assembly including:

a nozzle body having a first inlet in communication with the first distribution path for receiving the first fluid at the first inlet, a second inlet for receiving the second fluid and an outlet; and a mixing body defining a mixing chamber for mixing the first and second fluids to provide a mixed fluid, the mixed fluid being sprayed from the outlet of the nozzle body;

a fluid storage chamber;

a first electronically controlled valve coupled between the second distribution path and the fluid storage chamber, the first electronically controlled valve moveable between an open and a closed position for controlling flow of the second fluid from the second distribution path to the fluid storage chamber;

a second electronically controlled valve coupled between the fluid storage chamber and the second inlet of the nozzle body, the second electronically controlled valve moveable between an open and a closed position for controlling flow of the second fluid from the fluid storage chamber to the second inlet of the nozzle body; and a controller in communication with the first and second electronically controlled valves, the controller configured to supply a Pulse Width Modulation (PWM) signal to at least one of the first and second electronically controlled valves for controlling the opening and closing thereof;

wherein:

the controller is configured to hold one of the first and second electronically controlled valves in the open position while supplying the other of the first and second electronically controlled valves with the PWM signal;

the PWM signal is a first PWM signal;

the controller is configured to supply the first electronically controlled valve with the first PWM signal and is configured to supply a second Pulse Width Modulation (PWM) signal to the second electronically controlled valve for controlling the opening and closing thereof;

the first and second PWM signals have substantially the same frequency and differ in phase; and the controller is configured to:

supply the first PWM signal to the first electronically controlled valve to open the first electronically controlled valve during a first time and supply the second PWM signal to the second electronically controlled valve to open the second electronically controlled valve during the first time;

supply the first PWM signal to the first electronically controlled valve to close the first electronically controlled valve during a second time and supply the second PWM signal controls the second electronically controlled valve to instruct the first electronically controlled valve to remain open during the second time; and supply the first PWM signal to the first electronically controlled valve to instruct the first electronically controlled valve to remain closed during a third time and the second PWM signal to the second electronically controlled valve to close the second electronically controlled valve during the third time.

* * * * *